(12) United States Patent
Pelletier et al.

(10) Patent No.: US 7,769,901 B2
(45) Date of Patent: Aug. 3, 2010

(54) METHOD AND APPARATUS FOR FAST INTERNET PROTOCOL HEADERS COMPRESSION INITIALIZATION

(75) Inventors: Ghyslain Pelletier, Lulea (SE); Lila Madour, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1028 days.

(21) Appl. No.: 10/458,318

(22) Filed: Jun. 11, 2003

(65) Prior Publication Data

US 2004/0034708 A1 Feb. 19, 2004

Related U.S. Application Data (60) Provisional application No. 60/387,609, filed on Jun. 12, 2002.

(51) Int. Cl.
G06F 15/16 (2006.01)
(52) U.S. Cl. .................. 709/247; 709/228; 709/232; 709/246
(58) Field of Classification Search .............. 709/247, 709/238, 232, 246; 455/3.01; 370/392
See application file for complete search history.

(56) References Cited

U.S. PATENT DOCUMENTS

| | | | | |
|---|---|---|---|---|
| 7,010,727 | B1 * | 3/2006 | Stucker ........................ | 714/52 |
| 7,058,728 | B1 * | 6/2006 | Eklund ........................ | 709/247 |
| 7,062,253 | B2 * | 6/2006 | Money et al. ................ | 455/406 |
| 2002/0018010 | A1 * | 2/2002 | Le ................................ | 341/60 |
| 2002/0097723 | A1 * | 7/2002 | Tourunen et al. ............ | 370/392 |
| 2002/0138654 | A1 * | 9/2002 | Liu et al. .................... | 709/247 |
| 2003/0097476 | A1 * | 5/2003 | Saxena et al. ............... | 709/247 |
| 2003/0130000 | A1 * | 7/2003 | Le et al. ..................... | 455/502 |
| 2003/0198226 | A1 * | 10/2003 | Westberg ..................... | 370/393 |
| 2006/0009150 | A1 * | 1/2006 | Leung et al. ............... | 455/3.01 |

FOREIGN PATENT DOCUMENTS

| | | |
|---|---|---|
| WO | WO 01/31881 | 5/2001 |
| WO | WO 01/35598 | 5/2001 |

(Continued)

OTHER PUBLICATIONS

M. Degermark et al., IP Header Compression, Network Working Group, RFC 2507, Feb. 1999.

(Continued)

*Primary Examiner*—Djenane M Bayard
(74) *Attorney, Agent, or Firm*—Ericsson Inc.

(57) ABSTRACT

An Internet Protocol (IP) headers decompressor node, a method and an IP headers manager in an IP network for fast IP headers compression initialization is thereby provided. The invention teaches how to exchange IP packets between at least two nodes of the IP network for establishment of a session therebetween, to initialize, at a first one of the at least two nodes, a static portion of a decompression context prior to completion of the establishment of the session and to uncompress application related IP packets exchanged with a second of the at least two nodes. In an optional embodiment of the present invention, it is further taught how exchanging IP packets between at least two nodes of the IP network may further comprise extracting information from the IP packets at a first one of the at least two nodes of the IP network.

13 Claims, 4 Drawing Sheets

FOREIGN PATENT DOCUMENTS

| | | |
|---|---|---|
| WO | WO 01/65804 | 9/2001 |
| WO | WO 02/11397 | 2/2002 |

OTHER PUBLICATIONS

V. Jacobson, Compressing TCP/IP Headers for Low-Speed Serial Links, Network Working Group, RFC 1144, Feb. 1990.

S. Casner et al., Compressing IP/UDP/RTP Headers for Low-Speed Serial Links, Network Working Group, RFC 2508, Feb. 1999.

C. Bormann et al., Robust Header Compression (ROHC): Framework and four profiles: RTP, UDP, ESP, and uncompressed, Network Working Group, RFC 3095, Jul. 2001.

L.E. Jonsson et al., Robust Header Compression (ROHC): A Link-Layer Assisted Profile for IP/UDP/RTP, Network Working Group, RFC 3242, Apr. 2002.

Y. Saifullah et al., ROHC-TCP Early Compression in GPRS Networks, ROHC WG, Internet Draft, XP-002255138, Oct. 2002.

Y. Saifullah et al., ROHC-TCP Early Compression, ROHC WG, Internet Draft, XP-002255139, Oct. 2002.

International Search Report dated Oct. 10, 2003, received in corresponding PCT application PCT/CA03/00877.

* cited by examiner

METHOD AND APPARATUS FOR FAST INTERNET PROTOCOL HEADERS COMPRESSION INITIALIZATION

PRIORITY STATEMENT UNDER 35 U.S.C S.119 (e) & 37 C.F.R. S.1.78

This non-provisional patent application claims priority based upon the prior U.S. provisional patent application entitled "A method for IP Header compression", application No. 60/387,609, filed Jun. 12, 2002, in the names of Lila MADOUR and Ghyslain PELLETIER.

BACKGROUND OF THE INVENTION

1. Field of the Invention

The present invention relates to fast Internet Protocol Headers Compression initialization.

2. Description of the Related Art

Figure 1:
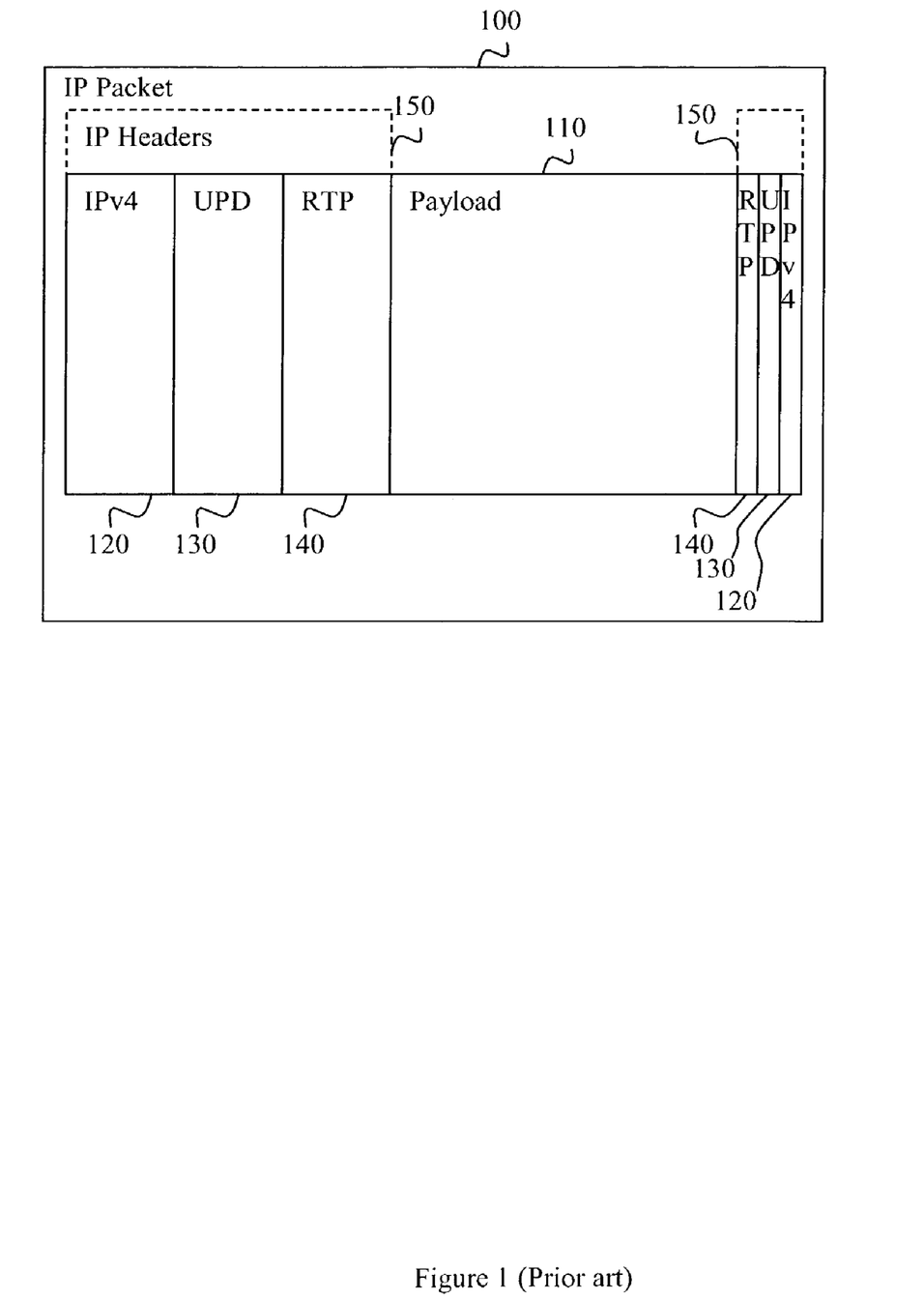
FIG. 1 shows a schematic representation of an exemplary Internet Protocol (IP) packet.

Due to the tremendous success of the Internet, it has become a challenging task to make use of the Internet Protocols (IP) over all kinds of network links. IP usually refer to numerous packet switching protocols such as IPv4 (Internet protocol version 4), IPv6 (Internet protocol version 6), UDP (User Datagram Protocol), UDP-Lite, TCP (Transport Control Protocol), RTP (Real-time Protocol), etc. An IP packet is usually composed of a payload of information sequentially encapsulated in one or more IP protocols. Reference is now made to the Drawings wherein FIG. 1 shows an exemplary IP packet 100 formed by a payload 110, a RTP header 140, a UDP header 130 and an IPv4 header 120. The IP packet 100 is referred to as an IPv4/UDP/RTP packet. For simplicity purposes, the headers 120, 130 and 140 are usually jointly referred to as IP headers 150. It should be understood that other sets and subsets of IP protocols each having different header configurations can be used to form the IP packet 100 and the IP headers 150. Each header 120, 130 and 140 of the IP headers 150 carries specific information about the IP packet 100, which information is used by the destination of the packet 100 to interpret the payload 110. The carried information in the IP headers may include origination and destination of the IP packet 100, associated quality of service information, a sequence number, checksum information for integrity of the payload, etc. One drawback of IP is the large size of the IP headers. It is not a simple task to make use of IP over narrow band network links as, for example, cellular links. As an example, using the IP protocols for ordinary speech data (e.g. Voice-over-IP or VoIP using IPv4/UPD/RTP or IPv6/UPD/RTP) may represent a loss of as much as 70% of the bandwidth capacity of a given network link.

The term header compression (HC) comprises the art of minimizing the necessary bandwidth used by the IP headers. It is usually performed on a per-hop basis over point-to-point network links. Header compression techniques, in general, have a more than ten-year-old history within the Internet community. Several techniques commonly used are described in the following documents: RFC 1144 [VJ], RFC 2507 [IPHC] and RFC 2508 [CRTP], all herein included by reference. Header compression takes advantage of the fact that some fields in the IP header are not changing (static) within a stream of packet pertaining to a given packet flow, or change with small or predictable values. Header compression techniques make use of these characteristics and send static information only initially, while changing fields are sent with their absolute values or as differences from packet to packet. Completely random information has to be sent without any compression at all. The challenging task of any header compression technique is to keep both ends of the network link consistent with each other. For that purpose, a compressor at one end and a decompressor at the other end each make use of a decompression context. The use of the decompression contexts aims at keeping the IP headers size as low as possible. To do so, each end manages all necessary information to eliminate some fields (totally or partially) from the IP headers at the compressor end and to rebuild the IP headers at the decompressor end.

Header compression techniques are thus an important component to make services such as VoIP over Wireless (VoI-PoW) an economically feasible alternative to circuit switched voice. For this purpose, some header compression techniques have been developed by the Robust Header Compression (ROHC) Working Group of the Internet Engineering Task Force (IETF). RFC 3095 [ROHC] herein included by reference, describes an extensible framework for which profiles for compression of various networking protocols may be defined. The following example takes the header compression technique defined in ROHC as an example. In such a case, the decompression contexts of both the compressor and the decompressor contain and maintain relevant information about past packets, which information is used to compress and decompress subsequent packets. More precisely, ROHC says the following: "The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for decompression. Moreover, additional information describing the packet stream [or flow] is also part of the context, for example information about how the IP Identifier field changes and the typical inter-packet increase in sequence numbers or timestamps."

In order to work properly, each header compression technique requires an initialization phase during which the compressor and the decompressor build their respective decompression context. This phase is usually referred to as the context initialization phase. It usually requires the compressor to start using a low compression state. Initially, the transmitted packets contain the information necessary to initialize at least the static and maybe the dynamic part of the decompressor context. The compressor must then have enough confidence that the decompressor has the proper context before a transition to a higher compression ratio takes place. This confidence may be achieved using explicit feedback from the decompressor to the compressor, or by sending a number of context initialization packets repeatedly for a large enough interval. The use of explicit feedback requires at least one Round-Trip Time (RTT) period before confidence may be achieved. The use of a pre-determined number of packets may achieve confidence in less than one RTT period but cannot absolutely guarantee that the decompressor does have the proper context other than optimistically expect to be successful with a high percentage rate. The maximum compression ratio achievable on a given link largely depends on the header compression technique used thereon. However, it takes several phases of confidence/transition before reaching the maximum compression ratio of a given compression technique.

The present solutions cause problems in situations where a high compression ratio must be reached in a short period of time. While the context initialization phase is necessary to ensure that higher compression efficiency may be achieved, it implies a certain delay for which the compression efficiency is far from optimal. In the example of VoIP flows over very narrow bandwidth wireless links, such delay impacts the perceived quality of speech until optimal compression efficiency is reached. While the impact for a constant flow is minimal and concealed to the first packets of the flow, it may be more significant for a more discontinuous flow and has to be minimized.

As it can be appreciated, there is a need for a fast Internet Protocol headers compression initialization technique. The present invention provides such a technique.

SUMMARY OF THE INVENTION

A first object of the present invention is directed to an Internet Protocol (IP) headers decompressor node in an IP network for fast IP headers compression initialization. The decompressor node comprises a communication module capable of managing at least one network link toward at least another node and participating in establishment of a session between at least two nodes of the IP network. The decompression node further comprises a decompression context initialization module capable of initializing at least one portion of a decompression context prior to completion of the establishment of the session between the at least two nodes of the IP network. The decompression node yet further comprises an application module capable of using the decompression context to uncompress application related IP packets exchanged with the at least another node.

In an optional embodiment of the present invention, the decompressor node may further comprise an IP headers manager capable of extracting information from at least one IP packet used during the establishment of the session. In such a case, the IP headers manager may even be further capable of extracting information from IP headers from a plurality of the at least one IP packet or from a plurality of the at least one IP packet forming a larger message.

A second object of the present invention is directed to a method for fast Internet Protocol (IP) headers compression initialization in an IP network. The method comprises a first step of exchanging IP packets between at least two nodes of the IP network for establishment of a session therebetween. The method then comprises a step of, at the first one of the at least two nodes, initializing a static portion of a decompression context prior to completion of the establishment of the session and yet a further step of uncompressing application related IP packets exchanged with a second of the at least two nodes.

In an optional embodiment of the present invention, the step of exchanging IP packets between at least two nodes of the IP network may further comprise extracting information from the IP packets at a first one of the at least two nodes of the IP network. Furthermore, the step of initializing a static portion of a decompression context prior to completion of the establishment of the session may further comprise initializing a static portion of a decompression context prior to completion of the establishment of the session using the extracted information.

A third object of the present invention is directed to an Internet Protocol (IP) headers manager for fast IP headers compression initialization. The headers manager comprises an IP headers reader capable of extracting information from at least one IP packet transiting by the IP headers manager and of uncompressing compressed IP headers of the at least one IP packet using one of at least one decompression contexts associated with the IP headers manager. The headers manager further comprises a decompression context manager capable of managing the one decompression context and of initializing at least one portion of the one decompression context using extracted information from the IP header reader. The headers manager yet further comprises an IP headers builder capable of constructing IP packets in conformance with various IP Protocols using the one decompression context.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

The present invention aims at allowing the compressor and the decompressor to perform the context initialization phase more efficiently. As outlined above, it is desirable to find a solution that will further optimize the header compression efficiency in system for which delay towards the optimal compression ratio must be minimized and for which bandwidth is very limited. One of the inventive mechanisms is to reuse information already known by both ends of a network link during the context initialization phase.

A decompression context usually has two components, which are a static portion and a dynamic portion. Both portions need to be initialized before being used by a given header decompressor to uncompress IP headers from a packet flow to which it is associated. The static portion relates to information that does not change for the lifespan of the associated packet flow. Likewise, the dynamic portion relates to information that may change for the lifespan of the associated packet flow. The changes in the dynamic portion are usually predictable. Each end treating the packet flow must have a header decompressor to uncompress IP headers from the packet flow. The decompression context is associated with the packet flow at the header decompressor end. In other words, each header decompressor at each end has a decompression context associated thereto.

A first embodiment of the solution proposes to reuse some information of one or more past streams of IP packets exchanged between the sending and the receiving ends. The past streams of IP packets can be used by header decompressors for initializing their respective decompression contexts. This mechanism takes advantage of the fact that other procedures (e.g. registration on the network, call establishment, etc.) occur prior to sending a first packet within a delay-sensitive session. It is of particular interest for applications and systems that can ensure that both the header decompressors can access information contained in the IP headers or the payload of the past stream of IP packets locally (i.e. without requesting such information from a distant node in the network).

Figure 2:
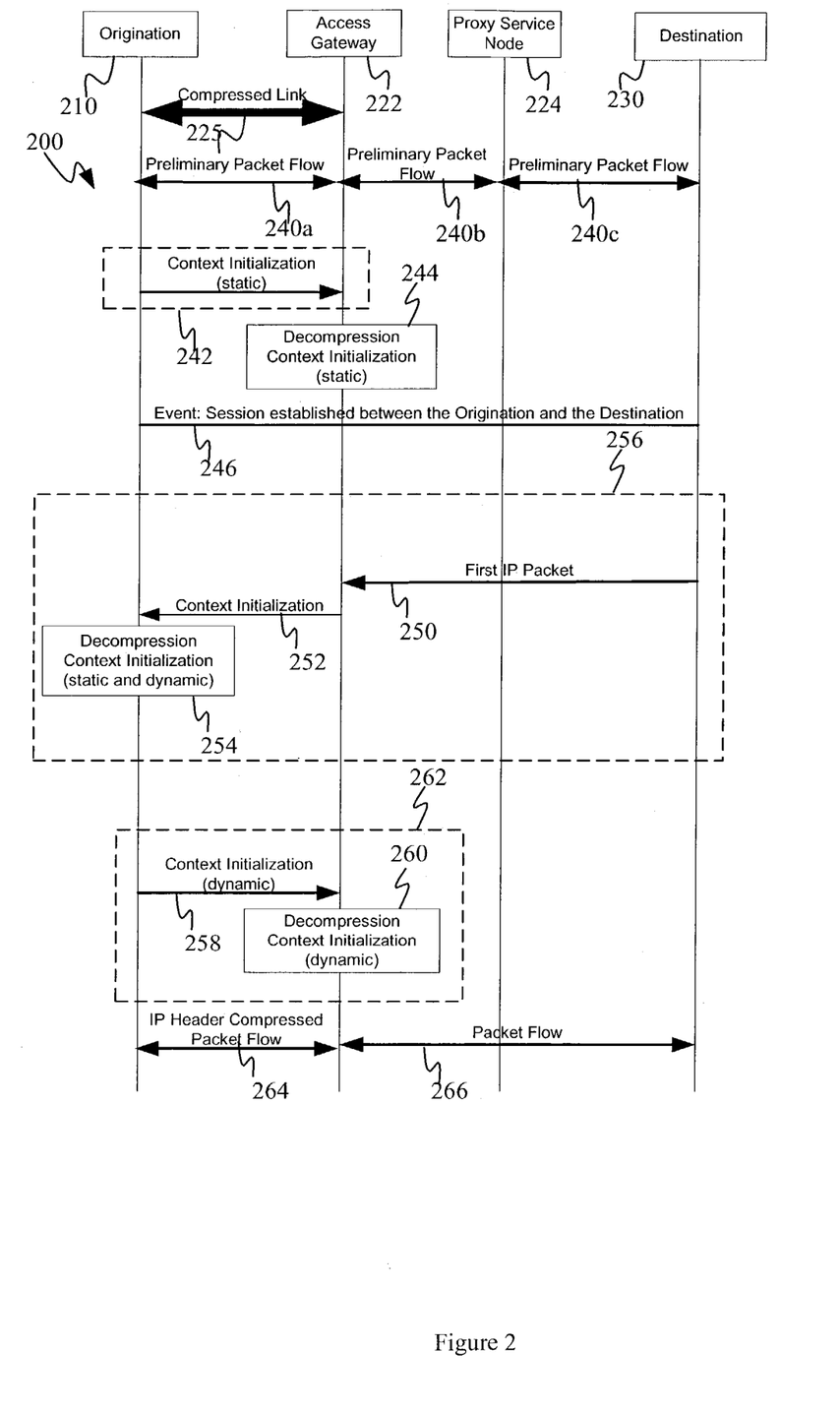
FIG. 2 is an exemplary signal flow and nodal operation chart of an Internet Protocol network implementing fast IP headers compression initialization mechanism in accordance with the present invention.

FIG. 2 depicts an exemplary schematic representation of an Internet Protocol (IP) network 200 implementing the fast IP headers decompression initialization mechanism of the present invention. FIG. 2 shows an Origination node 210, an Access Gateway 222, a Proxy Service Node 224 and a Destination node 230. The Origination 210 and the Access Gateway 222 are connected though a Compressed Link 225. The Compressed Link 225 should be used minimally and, preferably, with compressed IP Headers. The Access Gateway 222 is connected to Proxy Service Node 224. Both the Access Gateway 222 and the Proxy Service Node 224 are located within a single domain enabling them to exchange information at a high bit rate. They can be collocated within a single Network Node (not shown) or connected through a link supporting IP (not shown). The Proxy Service Node 224 is in turn connected to the Destination 230 through another link supporting IP (not shown). In the current example, preliminary packet flows 240a, 240b and 240c are respectively exchanged between the Origination 210, the Access Gateway 222, the Proxy Service Node 224 and the Destination 230. The preliminary packet flows 240a, 240b and 240c may be used for various purposes. FIG. 2 shows three preliminary packet flows 240a, 240b and 240c between the Origination 210 and the Destination 230. It should however be understood that any combination of preliminary packet flows can occur between the Origination 210 and the Destination 230. For instance, only preliminary packet flows 240a and 240b or a single preliminary packet flow (not shown) between the Origination 210 and the Destination 230 could be used. Examples of preliminary packet flows 240a, 240b and 240c include a previously compressed packet flow between the Origination 210 and the Destination 230 (e.g. a previous VoIP call), signaling for establishment of a session (e.g. a SIP session, a generic Packet Data Session), installation of a Traffic Flow Template (TFT), Packet Data Protocol (PDP) initialization (or context activation), Header Removal initialization parameters, etc. The preliminary packet flows 240a, 240b and 240c may transport various types of information, but should always be composed of at least one IP packet (not shown) with relevant IP headers (not shown). The IP headers used depend on the specific IP protocols used. The Access Gateway 222 is located on the path of the preliminary packet flows 240a and 240b. It is therefore possible for the Access Gateway 220 to stack the information contained in the IP headers or the payload from the preliminary packet flows 240a ad 240b. The Origination 210 also stacks information contained in the preliminary packet flow 240a. The stacked information may be used for decompression context initialization later on in the mechanism. It includes information related to the static portion of a decompression context such as IP addresses of both the Origination 210 and the Destination 230, protocols used, port numbers, Quality of Service (QoS), Type of Service (ToS), etc.

After the preliminary packet flows 240a, 240b and 240c, a session between the Origination 210 and the Destination 230 is on course to be established, but establishment is not yet competed. The Origination 210, the Access Gateway 222, the Proxy Service Node 224 and the Destination 230 all participate in the establishment of the session. In the example shown on FIG. 2, the establishment of the session has started in the preliminary packet flows 240a, 240b and 240c. At this point, the Access Gateway 222 has the necessary information to initialize the static portion of its Decompression Context (step 244) that will be used during the session between the Origination 210 and the Destination 230. The step 244 of initializing the static portion of the Decompression Context may optionally be triggered by a Context Initialization message 242 sent from the Origination 210 to the Access Gateway 222. In order to perform step 244, the Access Gateway 222 may use the stacked information of the IP headers or the payload from the preliminary packet flows 240a and 240b. If the stacked information is not sufficient, the Access Gateway 222 and the Origination 210 may contact each other (not shown) to complete initialization of the static portion. Furthermore, the Access Gateway 222 may contact other nodes (not shown) in the IP network 200 for the same purpose. For example, the Access Gateway 222 may complete the static portion of its decompression context by contacting the Proxy Service Node 224.

After the session is established 246 between the Origination 210 and the Destination 230, the Origination 210 and the Destination 230 may start sending payload information related to the session. FIG. 2 shows the example of the Destination sending a First IP Packet 250 related to the session toward Origination 210 through the Access Gateway 222. When the First IP Packets 250 reaches the Access Gateway 222, both portions of the Origination's 210 decompression context may be initialized. The Access Gateway 222 sends a Context Initialization message 252 with relevant information to the Origination 210 for that purpose. The Origination 210 then performs step 254 of initializing its Decompression Context. In order to perform step 254, the Origination 210 may use the stacked information of the IP headers or the payload from the preliminary packet flows 240a. If the stacked information is not sufficient, the Access Gateway 222 and the Origination 210 may contact each other (not shown) to complete initialization of the static and the dynamic portions. The packet 250, the message 252 and the step 254 are shown as a series of events 256 on FIG. 2.

After the session is established 246, the MS 210 itself is also ready to send the first IP packet of the session (step 256). Prior to this first IP packet, the MS 210 sends a Context Initialization message 258 to the Access Gateway 222 triggering step 260 of initializing the dynamic portion of the Decompression Context thereof. The Access Gateway 222 performs step 260 by using the information contained in the Context Initialization message 258. The Access Gateway 222 and the Origination 210 may further contact each other (not shown) to complete initialization of the dynamic portion. The message 258 and the step 260 are shown in a series of events 262 on FIG. 2. The series of events 256 and the series of events 262 are shown consecutive to one another. However both series 256 and 262 are independent and can occur at any time after the session is established 246.

Upon completion of steps 244, 254 and 260 of initializing the Decompression Contexts, the Origination 210 and the Access Gateway 222 can start exchanging a packet flow with compressed IP headers 264 between each other, thus using their respective Decompression Contexts to uncompress the IP packets thereof. It should be understood that IP packets (not shown) issued by the Origination 210 toward the Destination 230 are compressed at the Origination 210, sent in the packet flow with compressed IP headers 264, uncompressed at the Access Gateway 222 using the decompression context of the Access Gateway 222 and sent in a packet flow 266 toward the Destination 230. Similarly, IP packets (not shown) issued by the Destination 230 toward the Origination 210 are sent in the packet flow 266, compressed at the Access Gateway 222 and sent in the packet flow with compressed IP headers 264. Upon reception of the IP packets issued by the Destination 230, the Origination 210 may use its decompression context to uncompress the IP packets, but it may not be necessary depending on the content of the IP packets.

FIG. 2 shows the Access gateway 222 and the Proxy Service Node 224. In more specific examples, they could be respectively assimilated to a Packet Data Serving Node (PDSN) or Gateway General Packet Radio Service (GPRS) Support Node (GGSN) and a SIP Proxy or a Proxy-Call State Control Function (P-CSCF). Furthermore, FIG. 2 only shows one Compressed Link 225. However, it should be understood that multiple network configurations can connect the Origination 210 and the Access Gateway 222 without departing from the spirit of the present invention. For example, the Origination 210 can be connected to a base station (not shown) via an air interface, the base station being further connected to the Access Gateway 222 through a ground connection. In the same vein, multiple nodes (not shown) may be placed in the path between the Access Gateway 222 and the Destination 230 as long as the packet flow 266 can be routed therebetween.

A second embodiment of the solution is hereby described with particular reference to Session Initiation Protocol (SIP) within a telecommunications network using CDMA2000® standard. The CDMA2000® standard is also known as IMT-CDMA Multi-Carrier or IS-95. It is a Code-Division Multiple Access (CDMA) version of the IMT-2000 standard developed by the International Telecommunication Union (ITU). SIP is defined by the Internet Engineering Task Force (IETF in the Requests for Comments (RFC) number 2543 and 3252 [RFC 2543] and [RFC 3252] herein included by reference. It is used in various types of telecommunications networks to establish a session between a first and a second node. SIP specifies requests and responses to be exchanged within the network for managing the session (e.g. INVITE to start a new session and OK to accept an invitation into the new session). SIP further specifies characteristics of the session through a series of Session Description Protocol (SDP) parameters. Typical SDP parameters specified using SIP include media type and format allowed within the session as well as session information such as a session identification number, a network type, an address type and various address elements. The value of each SDP parameter changes depending on the type of traffic to be handled by the session. Therefore, it is important for all intermediate nodes involved in the session to agree on the SDP parameters used during the session. In the context of the present example, the intermediate nodes involved in the session refer to all network elements on paths between all ends of the session.

Figure 3:
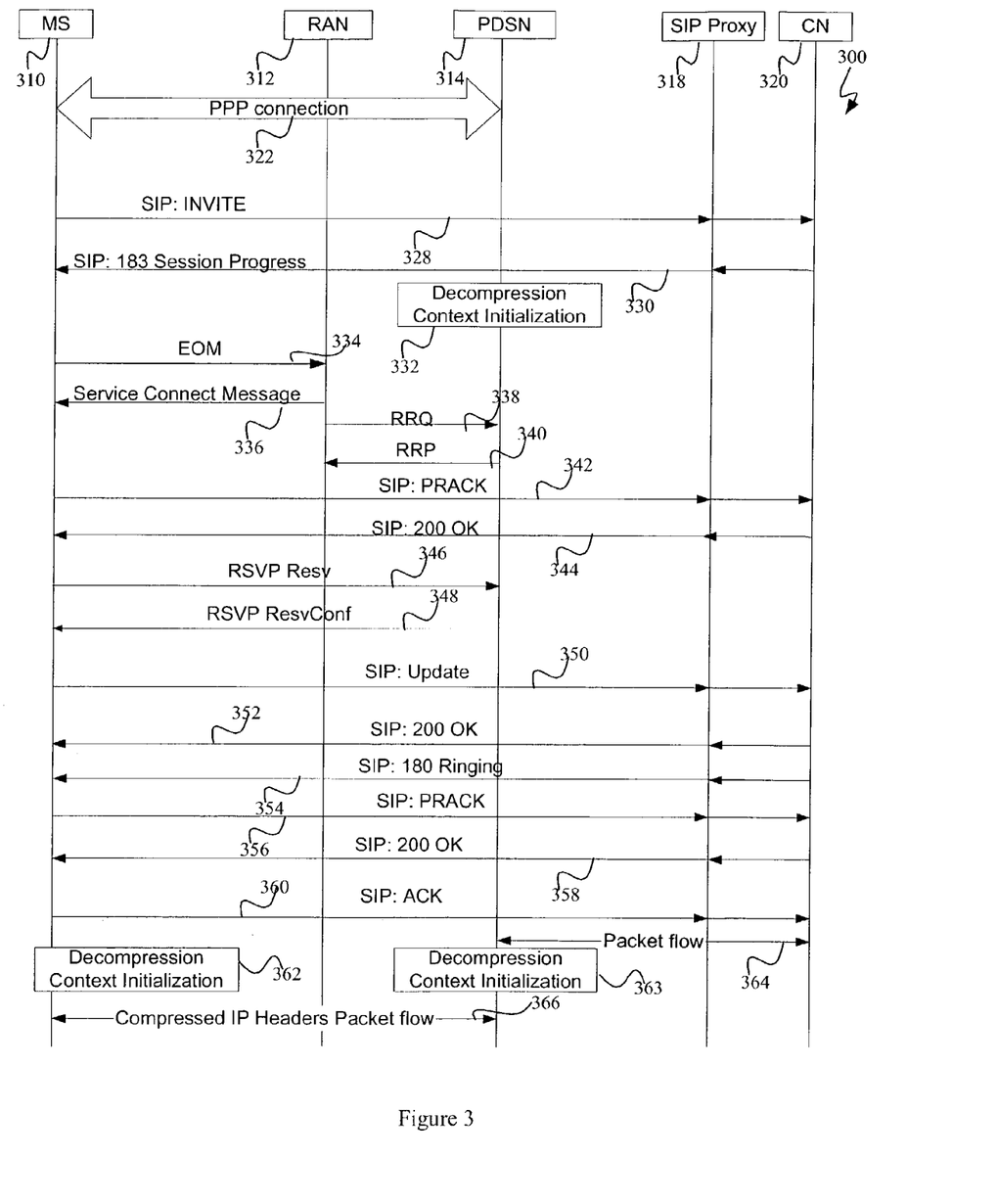
FIG. 3 is a signal flow and nodal operation chart of an exemplary CDMA2000® network implementing the fast Internet Protocol (IP) headers compression initialization mechanism using Session Initiation Protocol.

FIG. 3 is a signal flow and nodal operation chart of an exemplary CDMA2000® network 300 implementing the fast IP headers compression initialization mechanism using SIP. FIG. 3 shows a Mobile Station (MS) 310 connected via a Radio Access Network (RAN) 312 to a Packet Data Serving Node (PDSN) 314. FIG. 3 further shows a SIP proxy 318 and a Correspondent Node (CN) 320. The RAN 312 interfaces the MS 310 with the PDSN 314. The PDSN 314 manages the MS 310 connection to the network 300. The SIP proxy 318 supervises all SIP related exchanges in the network 300. It enables a session to be opened between the MS 310 and the CN 320 located within the network 300. Even though the CN 320 is shown in the network 300, it may be located in a distant network (not shown) without affecting the teachings of the present invention.

As a first step, the MS 310 establishes a Point-to-Point Protocol (PPP) session 322 with the PDSN 314. While establishing the PPP session 322, the MS 310 is assigned a main service instance, which provides a communication channel for the MS 310 to send and receive control messages and user data. The main service instance is known in CDMA2000® as SO33. The SO33 main service instance enables a Radio Link Protocol (RLP) to be used by the MS 310 toward the PDSN 314. For example RLP is used with a CDMA2000® Traffic Channel to support CDMA data services. The RLP is responsible for detecting frames received with errors and to perform retransmissions. The MS 310 also indicates its Header Compression capabilities (e.g., ROHC, LLAROHC, VJHC) to the PDSN 314 during establishment of the PPP session 322.

The PDSN 314 may then confirm credential of the MS 310 before going further in the process, but this is beyond the scope of the present invention.

In order to open a SIP session with the CN 320, the MS 310 then sends a SIP Invite message 328 thereto. The SIP invite message 328 contains all necessary information to be routed from the SIP Proxy 318 toward the CN 320. The CN 320 replies to the SIP invite message 328 with a SIP: 183 Session Progress message 330. Again, the SIP: 183 Session Progress message 330 contains all necessary information to be routed from the SIP Proxy 318 toward the MS 310. The SIP: 183 Session Progress message 330 further contains SDP parameters to be used during the SIP session. The PDSN 314, upon routing the SIP: 183 Session Progress message 330 may initialize the static portion of its decompression context (step 332). If the information at hand is not sufficient therefore, the PDSN 314 and the MS 310 may contact each other to complete initialization of the static portion of the decompression context. Furthermore, the PDSN 314 may contact other nodes (not shown) in the network 300 for the same purpose. For example, it may contact the SIP Proxy 318 in that regard. In a preferable embodiment of the present invention, the PDSN 314 contacts the MS 310 only if the required information cannot be found in any other nodes toward which IP headers compression is not to be used.

In parallel to sending the SP invite message 328, the MS 310 also confirms its needed resources with the RAN 312 in a proper standardized manner in the CDMA2000® network 300. Again, related steps and messages 334-340 go beyond the scope of the present invention.

Upon reception of the SIP: 183 Session Progress message 330, the MS 310 issues a series of SIP related messages 342, 344, 350-360 in order to update and maintain the SIP session with the CN 320. In parallel to the series of SIP related messages, the MS 310 may confirm Traffic Flow Template installation with the PDSN 314 through TFT Information Element (TFT IE) (messages 346, 348). Again, the content of such SIP related messages and TFT IE messages fall beyond the scope of the present invention and are shown as exemplary procedures.

Upon completion of the establishment of the SIP session, the substantive information of the SIP Session is exchanged between the MS 310 and the CN 320 in both directions. For that purpose, a packet flow 364 of legacy IP packets is exchanged between the CN 320 and the PDSN 314. At this stage, the MS 310 has sufficient information to initialize its decompression context (step 362). To do so, the MS 310 uses information already received from the PDSN 314 such as SDP parameters or the TFT IE. For example the TFT IE contains information related to some unchanging parts of the IP headers, which in turn becomes part of the decompression context. The MS 310 may contact the PDSN 314 or other nodes (not shown) in the network 300 to complete the step 362. The PDSN 314 further completes the dynamic portion of its decompression context (step 363) by using locally available information. An IP Headers compressed packet flow 366 is further exchanged between the PDSN 314 and the MS 310, thus enabling the SIP session to take place.

FIG. 3 shows an exemplary CDMA2000® network. It should therefore be understood that, following standard CDMA2000® procedures, other nodes may be involved and other steps may take place without departing from the spirit of the present invention. Also, the order in which some messages are exchanged and steps are performed is shown as an example only and does not affect the inventive teachings thereof. Moreover, a similar procedure could be used in other networks such as, for example, a General Packet Radio Service (GPRS) network with only minor differences as long as a packet data session is established. Such minor differences can include the use of a different protocol to initialize the session (e.g. H.323 or GPRS specific signaling instead of SIP). Likewise, the network elements 310-320 shown in FIG. 3 are named in accordance with CDMA2000® and may change as the network type changes. Again, in the GPRS example, the PDSN 314 node could be a Gateway GPRS Support Node (GGSN) or a Service GPRS Support Node (SGSN).

Figure 4:
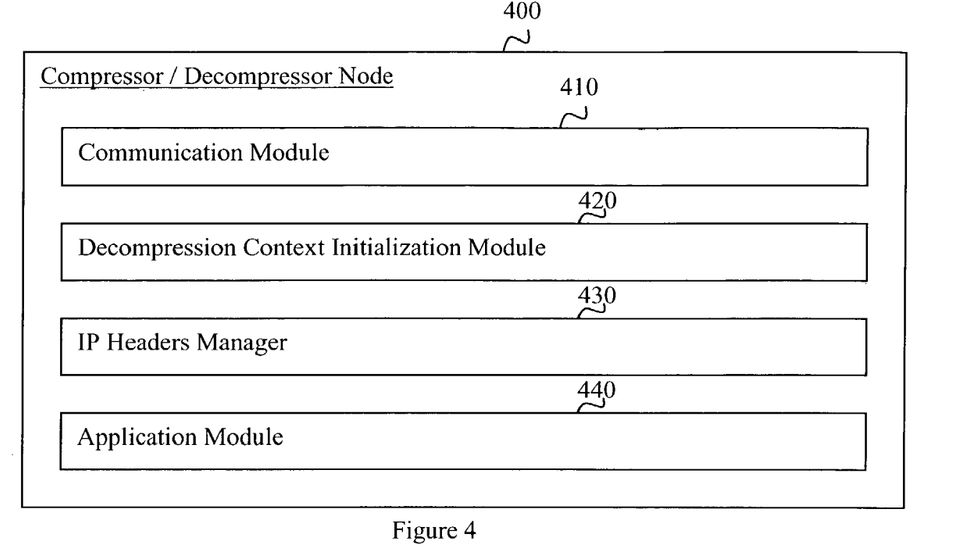
FIG. 4 is an exemplary modular representation of a compressor/decompressor node equipped to handle the fast Internet Protocol (IP) headers compression initialization mechanism.

FIG. 4 is an exemplary modular representation of a compressor/decompressor node 400 equipped to handle the fast Internet Protocol (IP) headers compression initialization mechanism. The compressor/decompressor node 400 has a Communication Module 410, a Decompression Context Initialization Module 420, an IP Headers Compression Module 430 and an Application Module 440. The Communication Module 410 of the compressor/decompressor node 400 is capable of managing the network link 225 discussed earlier. It is further capable of managing a wide range of network protocols such as, for example, the IP protocols or the PPP session described earlier. The Communication Module is yet further capable of participating in establishment of a session between at least two nodes of the IP network The Decompression Context Initialization Module 420 is capable of managing a decompression context. The decompression context may be located within the compressor/decompressor node 400 or within a second compressor/decompressor node (not shown). In such a case, the Decompression Context Initialization Module 420 would use the Communication Module 410 to communicate therewith. The IP Headers Managers 430 is capable of interpreting and extracting information from IP packets issued or transiting by the compressor/decompressor node 400. The IP Headers Managers 430 is further capable of interpreting and extracting information from IP Headers from one or more of the IP packets. It is yet further capable of interpreting and extracting information from a plurality of the IP packets forming a larger message. The Application Module 440 is capable of managing various applications, which make use of the fast Internet Protocol (IP) header compression initialization mechanism. Examples of such applications include, but are not limited to, VoIP and VoIPoW. In a typical example, the fast Internet Protocol (IP) headers compression initialization mechanism uses the Communication Module 410 to exchange signaling messages with neighboring nodes in order to establish a SIP session. The exchanged signaling messages are interpreted by the IP Headers Managers 430. The IP Headers Managers 430 then extracts some information therefrom and passes it to the Decompression Context Initialization Module 420. The Decompression Context Initialization Module 420 initializes the decompression context if it has all the information needed therefore. If not, the Decompression Context Initialization Module 420 may contact, through the Communication Module 410, at least another node prior to completing the initialization of the decompression context. After completed initialization of the decompression context, the Application Module 440 can make use of it to uncompress application related packets received from or addressed to neighboring nodes.

Figure 5:
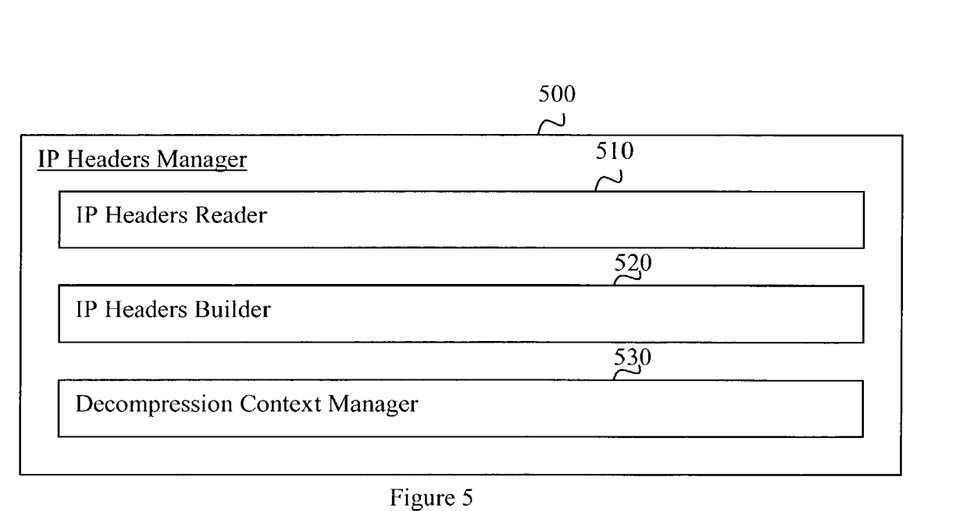
FIG. 5 is an exemplary modular representation of an Internet Protocol (IP) header manager enabling the fast Internet Protocol (IP) headers compression initialization mechanism.

FIG. 5 is an exemplary modular representation of an IP Headers Manager 500 enabling the fast Internet Protocol (IP) headers compression initialization mechanism. The IP Headers Compression Module 500 further comprises an IP Headers Reader 510, an IP headers Builder 520 and a Decompression Context manager 530. The IP headers Reader 510 is capable of interpreting and extracting information from IP packets issued or transiting by the IP Headers Manager 500. It is also capable of interpreting and extracting information from IP Headers from one or more of the IP packets. The IP Headers Reader 510 is further capable of interpreting and extracting information from a plurality of the IP packets forming a larger message. The IP Headers Reader is also capable of uncompressing compressed IP Headers of IP packets. The IP Headers Builder 520 is capable of constructing IP packets in conformance with various IP Protocols. It is capable of building IP packets with compressed or uncompressed IP headers. The Decompression Context Manager 530 is capable of managing a decompression context associated with the IP Headers Manager 500. In a typical example, the fast Internet Protocol (IP) header compression initialization mechanism uses the IP Headers Reader 510 to interpret IP packets pertaining to signaling messages. The IP Headers Reader 520 then extracts some information therefrom and passes it to the Decompression Context Manager 530. The Decompression Context Manager 530 initializes the decompression context if it has all the information needed therefore. If not, the Decompression Context Manager 530 may contact at least another node prior to completing the initialization of the decompression context. After completed initialization of the decompression context, the IP Header Builder and the IP Headers Reader can make use of it to uncompress application related packets received from or addressed to neighboring nodes.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. An Internet Protocol (IP) headers decompressor node for exchanging IP packets with at least another node over at least one network link in an IP network for fast IP headers compression initialization comprising:
   a communication module for:
       managing the at least one network link toward the at least another node;
       exchanging signaling messages with the at least another node over the at least one network link; and
       participating in establishment of a session between at least two nodes of the IP network;
   a decompression context initialization module for initializing at least one portion of a decompression context prior to completion of the establishment of the session between the at least two nodes of the IP network using information from IP packets exchanged with the at least another node prior to completion of the establishment of the session;

an application module for using the decompression context to uncompress application related IP packets exchanged with the at least another node; and an IP headers manager for extracting information from a plurality of IP packets used during the establishment of the session;

wherein no one of the plurality of IP packets used during the establishment of the session comprises all information needed to initialize the decompression context.

2. The decompressor node of claim 1, wherein the plurality of IP packets form a larger message.

3. The decompressor node of claim 1, wherein the IP headers manager is further for extracting information from messages related to at least one of Session Initiation Protocol (SIP), Traffic Flow Template (TFT), Packet Data Protocol (PDP) initialization, PDP context activation and Header Removal initialization.

4. The decompressor node of claim 1, wherein the decompression context initialization module is further for contacting at least another neighboring node prior to completing the initialization of the at least one portion of the decompression context.

5. The decompressor node of claim 1, wherein the at least one portion of the decompression context is a static portion thereof.

6. The decompressor node of claim 1, wherein the decompressor node is one of the at least two nodes of the session.

7. The decompressor node of claim 1, wherein the decompressor node is collocated with a Mobile Station (MS).

8. The decompressor node of claim 1, wherein the decompressor node is collocated with a Packet Data Serving Node (PDSN).

9. A method for fast Internet Protocol (IP) headers compression initialization in an IP network, the method comprising steps of:

exchanging IP packets between at least two nodes of the IP network for establishment of a session therebetween;

at the first one of the at least two nodes, initializing a portion of a decompression context prior to completion of the establishment of the session using information from the exchanged IP packets; and uncompressing application related IP packets exchanged with a second of the at least two nodes using the decompression context;

wherein the step of exchanging IP packets between at least two nodes of the IP network further comprises, at a first one of the at least two nodes of the IP network, extracting information from a plurality of IP packets used during the establishment of the session; and wherein no one of the plurality of IP packets used during the establishment of the session comprises all information needed to initialize the decompression context.

10. The method of claim 9, wherein the step of initializing a portion of a decompression context prior to completion of the establishment of the session further comprises initializing a portion of a decompression context prior to completion of the establishment of the session using the extracted information.

11. The method of claim 9, wherein the step of initializing a portion of a decompression context prior to completion of the establishment of the session is performed at a Packet Data Serving Node (PDSN).

12. The method of claim 9, wherein the step of initializing a portion of a decompression context prior to completion of the establishment of the session is performed at a Mobile Station (MS).

13. The method of claim 9, wherein the step of initializing a portion of a decompression context prior to completion of the establishment of the session further comprises communicating with at least another node of the IP network prior to completing the initialization of the decompression context.

* * * * *